Feb. 25, 1958  E. H. CUMPSTON, JR  2,824,500
REFINING MACHINE
Filed July 19, 1955
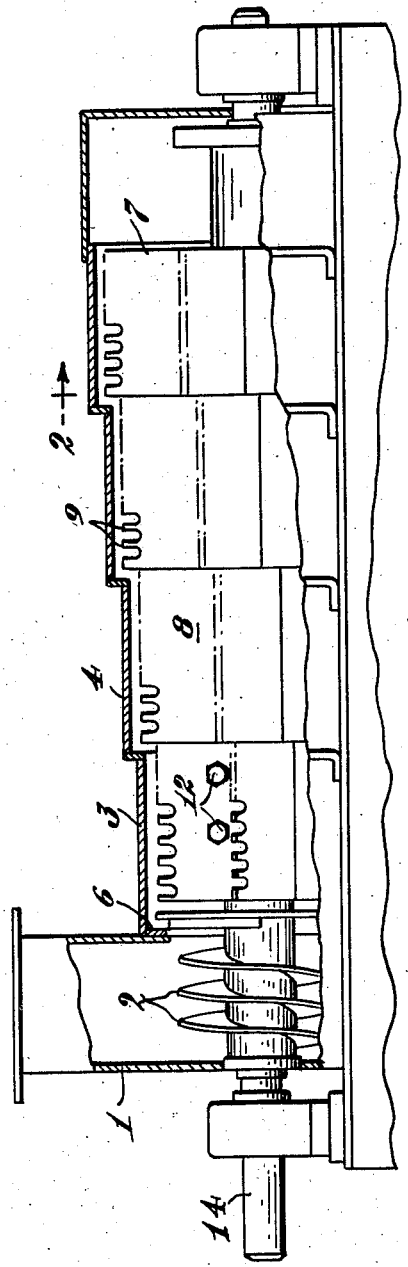
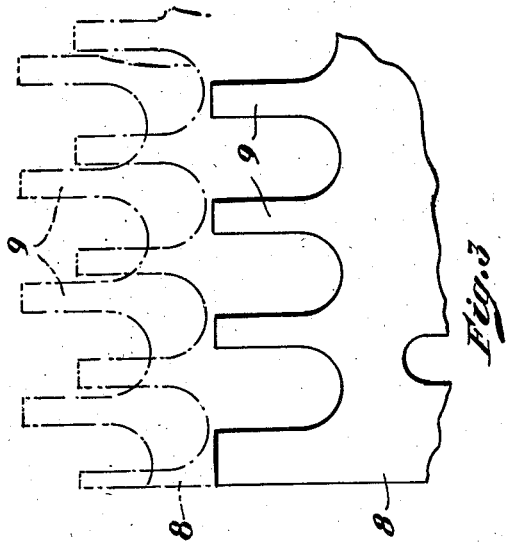
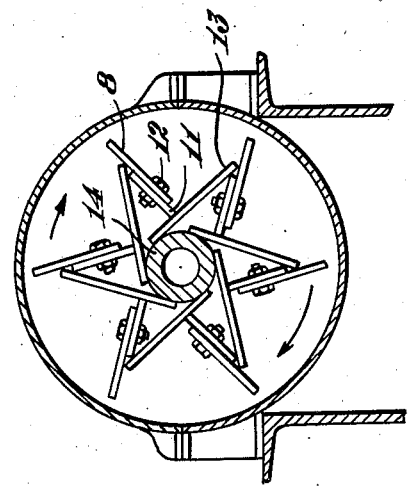
Inventor
Edward H. Cumpston Jr.
by Roberts, Cushman & Grover
Attys

United States Patent Office 2,824,500
Patented Feb. 25, 1958

2,824,500

REFINING MACHINE

Edward H. Cumpston, Jr., Pittsfield, Mass., assignor to E. D. Jones and Sons Company, Pittsfield, Mass., a corporation of Massachusetts Application July 19, 1955, Serial No. 522,972

5 Claims. (Cl. 92—26)

This invention relates to apparatus for breaking up material and more particularly to apparatus for defibering material such as chips, rags, etc., and for refining material such as paper-making pulp, this being an improvement on the apparatus disclosed and claimed in my copending Patent 2,722,163, granted November 1, 1955.

Objects of the invention are to provide a machine which will circulate material of high consistency, which requires less circulating power than prior machines, which has a wide range of severity of working action, which is simple and inexpensive to manufacture and which is durable and reliable in use.

Machines according to the present invention are characterized by a generally cylindrical chamber having an inlet at one end and an outlet at the other end, and a rotor mounted coaxially in the chamber, together with means at one end of the chamber for driving the rotor and means for feeding pulp into the chamber from the inlet, the rotor having peripheral rakes to work the pulp and throw it against the periphery of the chamber in the form of a thin cylindrical layer, the rakes being disposed in close juxtaposition to the periphery of the chamber to dig into the cylindrical layer and cause it to rotate, and the periphery of the chamber being unobstructed to permit rotation of the cylindrical layer, whereby the centrifugal force of the rotating cylindrical layer produces a lengthwise flow which is directed toward the outlet by the pressure of the incoming pulp.

According to the present invention the aforesaid cylindrical chamber comprises a plurality of sections, the diameter of each succeeding section being greater than that of the preceding section, and the radial dimension of the rakes of each succeeding section also being greater than that of the preceding section. Preferably the clearance between the rakes and the periphery of the chamber is approximately the same in each section. In the preferred embodiment the rakes in each section are disposed in rows extending lengthwise of the aforesaid shaft and the rakes of different rows are staggered relatively to each other.

For the purpose of illustration one embodiment is shown in the accompanying drawings in which Fig. 1 is a vertical center longitudinal section;

Fig. 2 is a section on line 2—2 of Fig. 1; and

Fig. 3 is a side view of one of the rake plates, succeeding plates being shown in broken lines to illustrate the staggered relationship between the successive rows of rakes.

The particular embodiment chosen for the purpose of illustration is similar to those described and claimed in the aforesaid patent in that it has a cylindrical chamber to which pulp is fed by means of a hopper 1 and a feed screw 2. However instead of being approximately uniform in diameter throughout its length, the cylindrical chamber is divided into sections 3 and 4, etc., each of which is somewhat larger in diameter than the preceding section. This facilitates flow of the thin layer of pulp through the machine because the back pressure, instead of extending continuously throughout the full length of the machine, extends throughout the length of only one section. After the pulp moves over the shoulder between sections it exerts no more back pressure on the layer of pulp in the preceding section. Thus the power required to drive the machine is reduced and the thickness of the layer of pulp around the periphery of the chamber may be controlled more accurately.

To prevent backward flow of pulp in the first section 3 a shoulder 6 is provided around the inlet. Thus the centrifugal force tending to cause the layer of pulp to flow lengthwise along the periphery of the chamber can only produce flow toward the outlet 7.

In the illustrative embodiment the rakes are in the form of plates 8 provided with teeth 9 along their outer margins. As shown in Figs. 1 and 2 these plates are sesured to plates 11 by means of bolts 12. At their inner edges the plates 11 are welded to plates 13 which are welded to the shaft 14 along their inner margins and to the plates 8 along their outer edges. Thus the rotating structure is well braced without being unduly heavy. As shown in Fig. 2 the rakes should incline outwardly and rearwardly, that is outwardly and in the direction opposite to the direction of rotation, and as shown in Fig. 3 successive rakes are staggered relatively to each other.

This machine affords many advantages. The power consumption is relatively low due to the absence of excessive turbulence because of the small amount of carrying fluid required. The severity of the working action can be easily controlled because the high viscosities permit the use of large easily controlled working clearances. The rate of flow through the machine is controlled solely by the input rate. The severity of the refining action can be adjusted by altering the material viscosity, the machine speed or the shape of the rakes. The axial dimensions of the rake teeth should be small, preferably about ¼ inch or less. For maximum refining action successive rake teeth lengthwise of the chamber should be spaced apart far enough to drag through the surface of the cylindrical layer of material without substantial dragging action on the material midway between the adjacent teeth. The spacing between the tips of the teeth and the periphery of the chamber should be about 0.01 inch to 1.00 inch depending on the size of the chips or other pieces of material. The linear velocity of the rakes may vary widely depending upon the material being worked and the degree of refining desired, but for ordinary refining of paper-making material it can be of the order of 4,000 feet per minute.

By dividing the cylindrical chamber into a plurality of sections, the diameter of each succeeding section being greater than that of the preceding section and the radial dimension of the rakes of each succeeding section also being greater than that of the preceding section, the machine requires even less power than the machines disclosed in the aforesaid patent and the pulp flows through the machine more easily.

It should be understood that the present disclosure is for the purpose of illustration only and that this invention includes all modifications and equivalents which fall within the scope of the appended claims. For example the cylindrical chambers may be heated as disclosed in my copending application Serial No. 381,932, filed September 23, 1953, now abandoned, while the refining action is taking place, and it may be used for mixing materials without refining action by using fewer rakes, slower speed or rakes with wider teeth.

What is claimed is:

1. A paper-pulp machine comprising an approximately cylindrical chamber having an inlet at one end and an outlet at the other end, a shaft extending along the axis of the chamber, and means on the shaft for throwing material against the periphery of the chamber in the form of a cylindrical layer and then working on the layer, said means comprising a series of rakes disposed in juxtaposition to the periphery of the chamber to drag through the cylindrical layer and cause it to rotate, so that the centrifugal force of the rotating cylindrical layer produces a lengthwise flow which is directed toward the outlet, said outlet extending around the chamber at said periphery so that the cylindrical layer can flow directly through the outlet lengthwise of the container throughout substantially the entire periphery, said rakes being spaced from said periphery to provide clearance, said chamber comprising a plurality of sections, the diameter of each succeeding section being greater than that of the preceding section, and the radial dimension of the rakes of each succeeding section also being greater than that of the preceding section, the exit end of each section being unobstructed so that the flow of material over the edge into the next succeeding section is unimpeded.

2. A paper-pulp machine comprising an approximately cylindrical chamber having an inlet at one end and an outlet at the other end, a shaft extending along the axis of the chamber, and means on the shaft for throwing material against the periphery of the chamber in the form of a cylindrical layer and then working on the layer, said means comprising a series of rakes disposed in juxtaposition to the periphery of the chamber to drag through the cylindrical layer and cause it to rotate, so that the centrifugal force of the rotating cylindrical layer produces a lengthwise flow which is directed toward the outlet, said outlet extending around the chamber at said periphery so that the cylindrical layer can flow directly through the outlet lengthwise of the container throughout substantially the entire periphery, said rakes being spaced from said periphery to provide clearance, said chamber comprising a plurality of sections, the diameter of each succeeding section being greater than that of the preceding section, and said clearance being approximately the same in each section, the exit end of each section being unobstructed so that the flow of material over the edge into the next succeeding section is unimpeded.

3. A paper-pulp machine comprising an approximately cylindrical chamber having an inlet at one end and an outlet at the other end, a shaft extending along the axis of the chamber, and means on the shaft for throwing material against the periphery of the chamber in the form of a cylindrical layer and then working on the layer, said means comprising a series of rakes disposed in juxtaposition to the periphery of the chamber to drag through the cylindrical layer and cause it to rotate, so that the centrifugal force of the rotating cylindrical layer produces a lengthwise flow which is directed toward the outlet, said outlet extending around the chamber at said periphery so that the cylindrical layer can flow directly through the outlet lengthwise of the container throughout substantially the entire periphery, said rakes being spaced from said periphery to provide clearance, said chamber comprising a plurality of sections, the diameter of each succeeding section being greater than that of the preceding section, the radial dimension of the rakes of each succeeding section also being greater than that of the preceding section, and the rakes in each section being disposed in rows extending lengthwise of said shaft and the rakes of different rows being staggered relatively to each other, the exit end of each section being unobstructed so that the flow of material over the edge into the next succeeding section is unimpeded.

4. A paper-pulp machine comprising an approximately cylindrical chamber having an inlet at one end and an outlet at the other end, a shaft extending along the axis of the chamber, and means on the shaft for throwing material against the periphery of the chamber in the form of a cylindrical layer and then working on the layer, said means comprising a series of rakes disposed in juxtaposition to the periphery of the chamber to drag through the cylindrical layer and cause it to rotate, so that the centrifugal force of the rotating cylindrical layer produces a lengthwise flow which is directed toward the outlet, said outlet extending around the chamber at said periphery so that the cylindrical layer can flow directly through the outlet lengthwise of the container throughout substantially the entire periphery, said rakes being spaced from said periphery to provide clearance, said chamber comprising a plurality of sections, the diameter of each succeeding section being greater than that of the preceding section, said clearance being approximately the same in each section, and the rakes in each section being disposed in rows extending lengthwise of said shaft and the rakes of different rows being staggered relatively to each other, the exit end of each section being unobstructed so that the flow of material over the edge into the next succeeding section is unimpeded.

5. A paper-pulp machine comprising an approximately cylindrical chamber having an inlet at one end and an outlet at the other end, a shaft extending along the axis of the chamber, and means on the shaft for throwing material against the periphery of the chamber in the form of a cylindrical layer and then working on the layer, said means comprising rakes disposed in juxtaposition to the periphery of the chamber to drag through the cylindrical layer and cause it to rotate, so that the centrifugal force of the rotating cylindrical layer produces a lengthwise flow which is directed toward the outlet, said outlet extending around the chamber at said periphery so that the cylindrical layer can flow directly through the outlet lengthwise of the container throughout substantially the entire periphery, said chamber comprising a plurality of sections, the diameter of each section being greater than that of the preceding section, said rakes being spaced from said periphery to provide clearance, and the rakes being disposed in rows extending lengthwise of said shaft and the rakes of different rows being staggered relatively to each other, the exit end of each section being unobstructed so that the flow of material over the edge into the next succeeding section is unimpeded.

References Cited in the file of this patent

UNITED STATES PATENTS

| | | |
|---|---|---|
| 489,079 | Kellner | Jan. 3, 1893 |
| 1,187,932 | Ryther | June 20, 1916 |
| 1,225,874 | Shartle | May 17, 1917 |
| 1,922,313 | Mason | Aug. 15, 1933 |
| 2,182,391 | Skolnik | Dec. 5, 1939 |
| 2,527,772 | Stapley et al. | Oct. 31, 1950 |
| 2,693,738 | Jones | Nov. 9, 1954 |
| 2,722,163 | Cumpston | Nov. 1, 1955 |

FOREIGN PATENTS

| | | |
|---|---|---|
| 2,001 | Austria | Aug. 25, 1900 |
| 8,903 | Great Britain | May 29, 1889 |
| 12,048 | Sweden | Feb. 16, 1901 |